United States Patent
Akita et al.

(10) Patent No.: US 11,217,842 B2
(45) Date of Patent: Jan. 4, 2022

(54) POWER STORAGE DEVICE

(71) Applicant: Sumitomo Electric Industries, Ltd., Osaka (JP)

(72) Inventors: Tetsuo Akita, Osaka (JP); Mitsuyasu Ueda, Osaka (JP); Naoki Ayai, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 118 days.

(21) Appl. No.: 16/496,873

(22) PCT Filed: Nov. 9, 2017

(86) PCT No.: PCT/JP2017/040410
§ 371 (c)(1),
(2) Date: Sep. 23, 2019

(87) PCT Pub. No.: WO2018/173355
PCT Pub. Date: Sep. 27, 2018

(65) Prior Publication Data
US 2020/0036069 A1    Jan. 30, 2020

(30) Foreign Application Priority Data
Mar. 24, 2017  (JP) .............................. JP2017-059272

(51) Int. Cl.
*H01M 10/667*    (2014.01)
*H01M 2/10*      (2006.01)
(Continued)

(52) U.S. Cl.
CPC ....... *H01M 10/667* (2015.04); *H01M 10/425* (2013.01); *H01M 10/613* (2015.04);
(Continued)

(58) Field of Classification Search
None
See application file for complete search history.

(56) References Cited

U.S. PATENT DOCUMENTS

2006/0078786 A1* 4/2006 Wu ....................... H01M 50/20
429/62
2008/0251246 A1  10/2008 Ohkuma et al.
(Continued)

FOREIGN PATENT DOCUMENTS

JP    09-171806 A     6/1997
JP    2007-234371 A   9/2007
(Continued)

*Primary Examiner* — Ula C Ruddock
*Assistant Examiner* — Mary Grace Byram
(74) *Attorney, Agent, or Firm* — Baker Botts L.L.P.; Michael A. Sartori

(57) ABSTRACT

A power storage device according to an aspect of the present disclosure includes: a casing including a bottom wall and a top wall opposite to the bottom wall; a storage battery; an electrical unit; and a cooling unit. The storage battery is disposed in the casing and separated from the bottom wall. The electrical unit is disposed in the casing and located closer to the top wall than the storage battery is. A first fan is disposed between the storage battery and the electrical unit and configured to direct air from the storage battery toward the electrical unit.

11 Claims, 3 Drawing Sheets

(51) Int. Cl.
  *H01M 10/6563* (2014.01)
  *H01M 10/613* (2014.01)
  *H01M 50/20* (2021.01)
  *H01M 50/24* (2021.01)
  *H01M 10/6565* (2014.01)
  *H01M 10/42* (2006.01)
(52) U.S. Cl.
  CPC ... *H01M 10/6563* (2015.04); *H01M 10/6565* (2015.04); *H01M 50/20* (2021.01); *H01M 50/24* (2021.01)

(56) References Cited

U.S. PATENT DOCUMENTS

| | | | |
|---|---|---|---|
| 2010/0248004 A1* | 9/2010 | Takeshita | H01M 50/213 429/156 |
| 2013/0280565 A1* | 10/2013 | Lee | H01M 50/20 429/71 |
| 2014/0242427 A1* | 8/2014 | Tanaka | H01M 10/0525 429/61 |
| 2015/0162651 A1* | 6/2015 | Nakahama | H01M 10/6551 429/120 |
| 2016/0270254 A1 | 9/2016 | Brianese | |

FOREIGN PATENT DOCUMENTS

| | | |
|---|---|---|
| JP | 2010-262842 A | 11/2010 |
| JP | 2014-107207 A | 6/2014 |
| JP | 2015-115167 A | 6/2015 |

* cited by examiner

POWER STORAGE DEVICE

TECHNICAL FIELD

The present disclosure relates to a power storage device. The present application claims priority to Japanese Patent Application No. 2017-059272 filed on Mar. 24, 2017, the disclosure of which is hereby incorporated by reference in its entirety.

BACKGROUND ART

Japanese Patent Laying-Open No. H09-171806 (PTL 1) for example discloses a power storage device including a battery housing and a storage battery disposed in the battery housing.

CITATION LIST

Patent Literature

PTL 1: Japanese Patent Laying-Open No. H09-171806

SUMMARY OF INVENTION

A power storage device according to an aspect of the present disclosure includes a casing, a storage battery, an electrical unit, and a first fan. The casing includes a bottom wall and a top wall. The top wall is opposite to the bottom wall. The storage battery is disposed in the casing and separated from the bottom wall. The electrical unit is disposed in the casing and located closer to the top wall than the storage battery is. The first fan is disposed between the storage battery and the electrical unit and configured to direct air from the storage battery toward the electrical unit.

DETAILED DESCRIPTION

Figure 1:
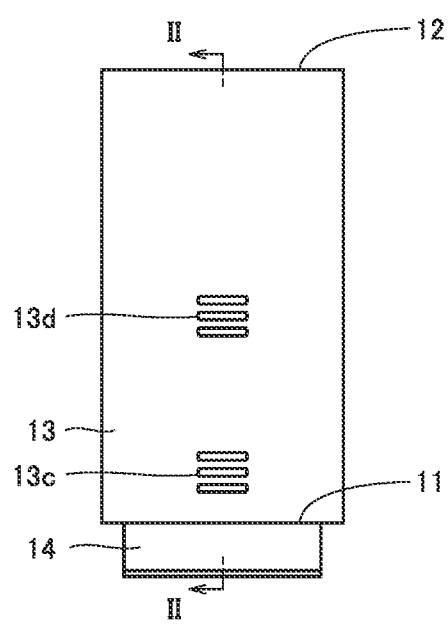
FIG. 1 is a side view of a power storage device according to an embodiment.

Problem to be Solved by the Present Disclosure

The storage battery could be degraded in performance as the temperature increases. The power storage device is therefore required to efficiently cool the storage battery. For the power storage device disclosed in PTL 1, however, no particular measures are taken for efficiently cooling such a storage battery.

The present disclosure is made in view of the problem in the conventional art as described above. More specifically, the present disclosure provides a power storage device capable of efficiently cooling a storage battery disposed in a casing.

Advantageous Effect of the Present Disclosure

A power storage device according to an aspect of the present disclosure is capable of efficiently cooling a storage battery disposed in a casing.

Description of Embodiments of the Present Disclosure

Initially, embodiments of the present disclosure are described one by one.

(1) A power storage device according to an aspect of the present disclosure includes: a casing including a bottom wall and a top wall opposite to the bottom wall: a storage battery; an electrical unit; and a cooling unit. The storage battery is disposed in the casing and separated from the bottom wall. The electrical unit is disposed in the casing and located closer to the top wall than the storage battery is. A first fan is disposed between the storage battery and the electrical unit and configured to direct air from the storage battery toward the electrical unit.

The above-described power storage device of (1) is capable of efficiently cooling the storage battery disposed in the casing.

(2) The above-described power storage device of (1) may further include a support plate which is disposed in the casing and on which the storage battery is mounted. The casing may further include a side wall continuing from the top wall and from the bottom wall. The support plate has an opening extending through the support plate in a portion where the storage battery is not mounted. The side wall has an air inlet extending through the side wall and connecting a space between the bottom wall and the support plate to an outside of the casing.

The above-described power storage device of (2) is capable of more efficiently cooling the storage battery disposed in the casing.

(3) The above-described power storage device of (2) may further include a filter disposed to cover the opening.

The above-described power storage device of (3) can prevent dust, insect, and the like from reaching the peripheries of the storage battery, the cooling unit, and the electrical unit.

(4) In the above-described power storage device of (2), the support plate may include a protrusion disposed to sandwich the storage battery and protruding toward the top wall.

In the above-described power storage device of (4), positional displacement of the storage battery on the support plate can be suppressed.

(5) The above-described power storage device of (4) may further include a protective member disposed to cover the protrusion.

In the above-described power storage device of (5), damage and the like to the storage battery due to contact of the protrusion against the storage battery can be suppressed.

(6) The above-described power storage device of (1) may further include a fixture disposed on a side of the first fan located to face the storage battery, and the fixture protrudes from the first fan toward the storage battery and abuts against the storage battery.

In the above-described power storage device of (6), the position of the storage battery can be fixed without hindering cooling of the storage battery and the electrical unit.

(7) in the above-described power storage device of (6), the fixture may include a cushioning member disposed in a portion of the fixture, the portion being abutting against the storage battery.

In the above-described power storage device of (7), excessive stress can be prevented from being applied from the fixture to the storage battery and generation of cracks and the like in the storage battery can be suppressed.

(8) In the above-described power storage device of (1) the electrical unit may include a seal member, a heat-generating component, and a heat sink. The heat-generating component is disposed in a space defined by the seal member. The heat sink is disposed to face the first fan, and exposed at least partially from the seal member.

The above-described power storage device of (8) can cool the electrical unit while keeping the inside of the electrical unit dustproof (9) In the above-described power storage device of (8), the electrical unit may further include a second fan disposed in the space defined by the seal member, The above-described power storage device of (9) can efficiently cool the electrical unit while keeping the inside of the electrical unit dustproof

(10) In the above-described power storage device of (1), the casing may further include a side wall continuing from the top wall and from the bottom wall. The side wall has an air outlet extending through the side wall and located closer to the bottom wall than the first fan is.

The above-described power storage device of (10) can prevent rainwater and the like from entering the casing.

<Details of Embodiments of the Present Disclosure>

Next, details of embodiments of the present disclosure are described with reference to the drawings. In the drawings, the same or corresponding parts are denoted by the same reference characters. Optionally, the embodiments described below may be combined at least partially.

<Configuration of Power Storage Device According to Embodiment>

In the following, a configuration of a power storage device according to an embodiment is described.

Figure 2:
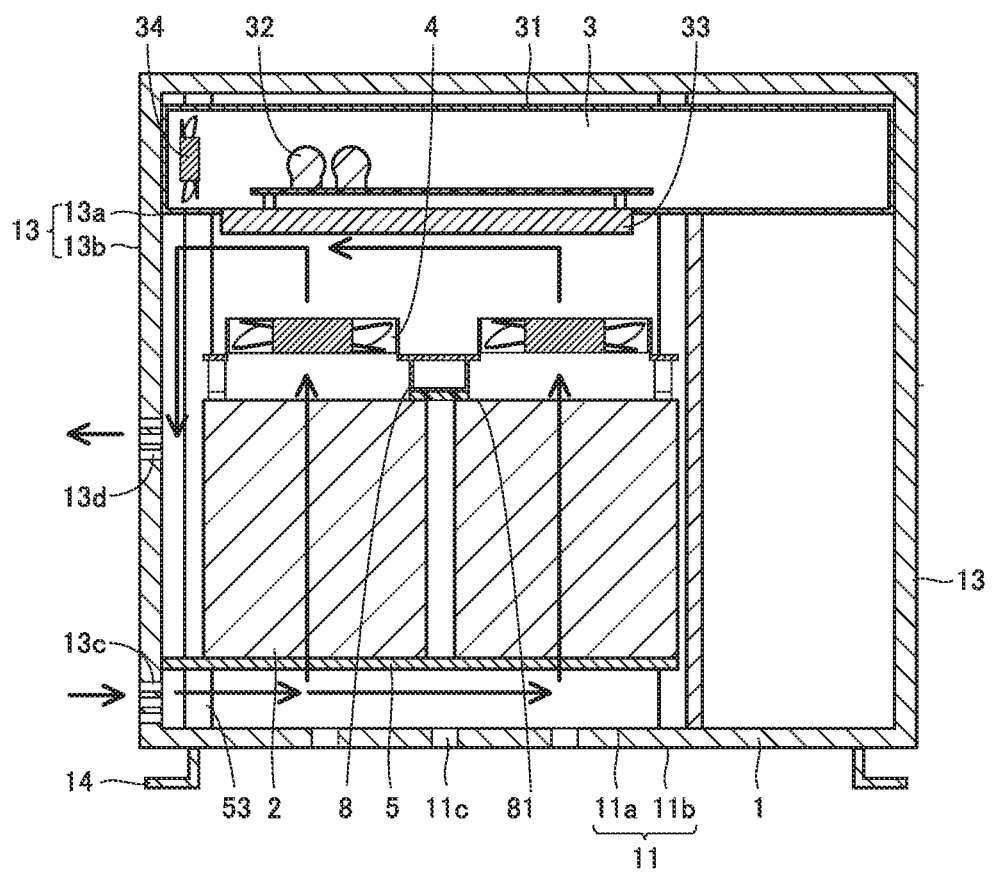
FIG. 2 is a cross-sectional view along II-II in FIG. 1.

FIG. 1 is a side view of a power storage device according to an embodiment. FIG. 2 is a cross-sectional view along II-II in FIG. 1. In FIG. 2, flow of air is indicated by arrows. As shown in FIGS. 1 and 2, the power storage device according to an embodiment includes a casing 1, a storage battery 2, an electrical unit 3, and a first fan 4. The power storage device according to an embodiment may further include a support plate 5, a filter 6, a protective member 7, and a fixture 8.

Casing 1 includes a bottom wall 11, a top wall 12, and a side wall 13. Bottom wall 11 is opposite to a mount surface on which the power storage device is mounted. Bottom wall 11 has an inner surface 11a and an outer surface 11b. Inner surface 11a is an inside surface of casing 1. Outer surface 11b is a surface opposite to inner surface 11a. Top wall 12 is opposite to bottom wall 11. Side wall 13 continues from bottom wall 11 and from top wall 12. Side wall 13 has an inner surface 13a and an outer surface 13b. Inner surface 13a is an inside surface of casing 1. Outer surface 13b is a surface opposite to inner surface 13a. Casing 1 has a leg 14. On the mount surface, leg 14 supports casing 1.

Figure 3:
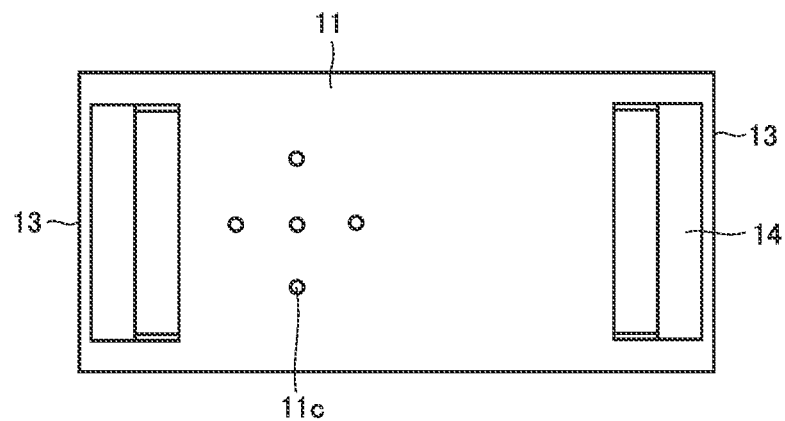
FIG. 3 is a bottom view of the power storage device according to an embodiment.

FIG. 3 is a bottom view of the power storage device according to an embodiment. As shown in FIG. 2, bottom wall 11 has a through hole 11c. Through hole 11c extends through bottom wall 11 in the direction from inner surface 11a toward outer surface 11b (or the direction from outer surface 11b toward inner surface 11a). More than one through hole 11c may be provided. Water and the like entering the inside of casing 1 is drained from through hole 11c.

As shown in FIGS. 1 and 2, side wall 13 has an air inlet 13c and an air outlet 13d. Preferably, air inlet 13c is formed in side wall 13 in which air outlet 13d is formed. Air inlet 13c extends through side wall 13 in the direction from inner surface 13a toward outer surface 13b (or the direction from outer surface 13b toward inner surface 13a). Air outlet 13d extends through side wall 13 in the direction from inner surface 13a toward outer surface 13b (or the direction from outer surface 13b toward inner surface 13a). Air inlet 13c is located closer to bottom wall 11 than support plate 5 is. Accordingly, air inlet 13c connects the space between bottom wall 11 and support plate 5 to the outside of casing 1. Air outlet 13d is located closer to bottom wall 11 than first fan 4 is. Air outlet 13d is located closer to top wall 12 than air inlet 13c is. From air inlet 13c, air is introduced to cool storage battery 2 and electrical unit 3. From air outlet 13d, air having cooled storage battery 2 and electrical unit 3 is discharged. More than one air inlet 13c may be provided, and more than one air outlet 13d may be provided.

As shown in FIG. 1, storage battery 2 is disposed in casing 1. Storage battery 2 is separated from bottom wall 11. Storage battery 2 is a lithium (Li)-ion battery, for example.

Electrical unit 3 is disposed in casing 1. Electrical unit 3 is located closer to top wall 12 than storage battery 2 is. Electrical unit 3 may include a seal member 31, a heat-generating component 32, and a heat sink 33. Electrical unit 3 may further include a second fan 34.

Seal member 31 defines an internal space of electrical unit 3. The internal space of electrical unit 3 is airtight-sealed by seal member 31. Heat-generating component 32 is disposed in the space defined by seal member 31. Heat-generating component 32 is an electrical component generating heat during operation of electrical unit 3. Heat-generating component 32 is a reactor or the like, for example.

Heat sink 33 is disposed along a side of electrical unit 3, i.e., the side facing first fan 4. Heat sink 33 is exposed at least partially from seal member 31. Heat sink 33 is made of a high-thermal-conductivity material such as aluminum alloy, for example. Heat sink 33 may have a fin protruding toward first fan 4. Preferably, the fin extends toward side wall 13. Electrical unit 3 includes a power semiconductor device (not shown) such as vertical MOSFET (Metal Oxide Semiconductor Field Effect Transistor) or IGBT (Insulated Gate Bipolar Transistor). Preferably, this power semiconductor device is mounted on heat sink 33.

Second fan 34 is disposed in the space defined by seal member 31. Preferably, the output power of second fan 34 is smaller than the output power of first fan 4. Preferably, second fan 34 is configured to supply air toward heat-generating component 32.

As shown in FIG. 1, first fan 4 is disposed in casing 1. More specifically, first fan 4 is disposed between storage battery 2 and electrical unit 3. First fan 4 is separated from electrical unit 3. The output power of first fan 4 is larger than the output power of second fan 34. First fan 4 is configured to direct air introduced from air inlet 13c, from storage battery 2 toward electrical unit 3. More specifically, first fan 4 causes air having cooled storage battery 2 to flow to electrical unit 3. The air impinging against electrical unit 3 is guided toward side wall 13 and discharged from air outlet 13d into the outside of casing 1.

Figure 4:
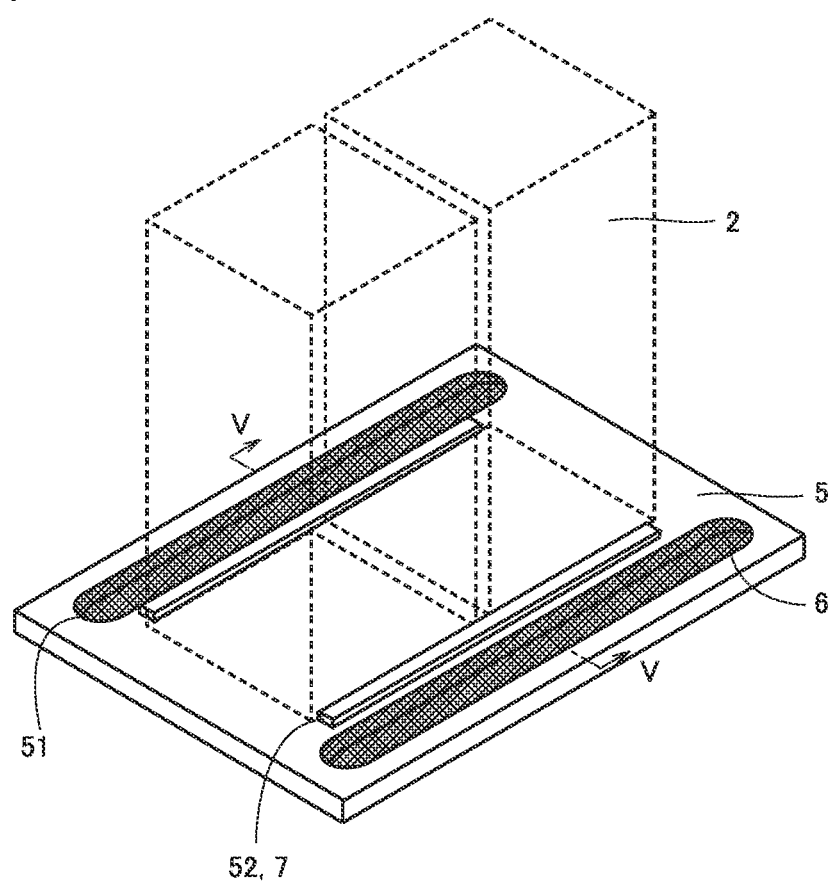
FIG. 4 is a partial perspective view of a support plate and its nearby components.
Figure 5:
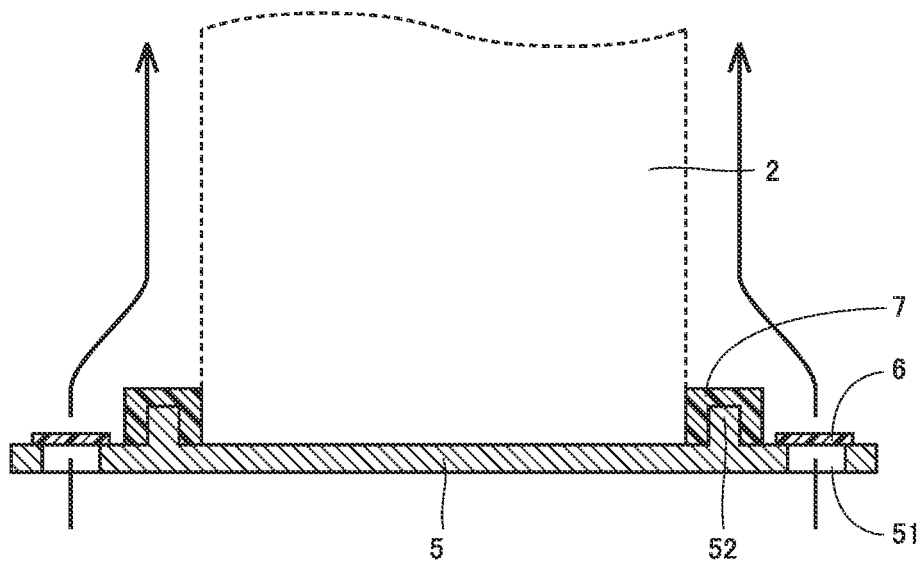
FIG. 5 is a cross-sectional view along V-V in FIG. 4.

Support plate 5 is disposed in casing 1. Support plate 5 extends in parallel with bottom wall 11. Support plate 5 is separated from bottom wall 11. On support plate 5, storage battery 2 is mounted. FIG. 4 is a partial perspective view of the support plate and its nearby components. FIG. 5 is a cross-sectional view along V-V in FIG. 4. In FIG. 5, flow of air cooling storage battery 2 is indicated by arrows. As shown in FIGS. 4 and 5, support plate 5 has an opening 51. Opening 51 extends through support plate 5 in the direction from bottom wall 11 toward top wall 12 (or the direction from top wall 12 toward bottom wall 11). Opening 51 is formed in a portion where storage battery 2 is not mounted. Air introduced from air inlet 13c into the inside of casing 1 flows through opening 51 to be drawn into first fan 4.

Support plate 5 includes a protrusion 52. Protrusion 52 is located on a surface of support plate 5 on which storage battery 2 is mounted (the top wall 12-side surface of support plate 5). Protrusion 52 is disposed to sandwich storage battery 2 mounted on support plate 5. Protrusion 52 protrudes toward top wall 12.

Support plate 5 is attached to a column 53, for example. Column 53 is attached to bottom wall 11. Column 53 extends from bottom wall 11 toward top wall 12. In this way, support plate 5 is supported in casing 1.

Filter 6 is disposed on opening 51. Filter 6 catches dust, insect, and the like contained in air which is introduced from air inlet 13c into casing 1 to flow through opening 51. Protective member 7 is disposed to cover protrusion 52. For protective member 7, a flexible material is used. The material used for protective member 7 is rubber, for example. Protective member 7 is a flexible bushing, for example.

Fixture 8 is disposed on a surface of first fan 4, i.e., the surface located to face storage battery 2. Fixture 8 protrudes from first fan 4 toward storage battery 2. Fixture 8 abuts against storage battery 2. Fixture 8 holds storage battery 2 between fixture 8 and support plate 5 to thereby fix the position of storage battery 2.

Fixture 8 defines a space between storage battery 2 and first fan 4. Preferably, fixture 8 is disposed along the outer periphery of first fan 4 so as not to block the flow of air to be drawn into first fan 4. Preferably, fixture 8 has a U shape.

Fixture 8 includes a cushioning member 81. Cushioning member 81 is disposed in a portion of fixture 8, i.e., the portion abutting against storage battery 2. Cushioning member 81 is made of a flexible material. The material used for cushioning member 81 is rubber, for example.

<Advantageous Effects of Power Storage Device According to Embodiment>

Advantageous effects of the power storage device according to an embodiment are described in the following.

Air which is introduced from air inlet 13c by first fan 4 initially cools storage battery 2. The air having cooled storage battery 2 is then supplied by first fan 4 to a nearby region of electrical unit 3. It is therefore possible to cool both storage battery 2 and electrical unit 3 by a single fan (first fan 4). The air supplied to a nearby region of storage battery 2 is relatively lower in temperature than the air supplied to a nearby region of electrical unit 3. Thus, cooling of storage battery 2 having a significant influence on the lifetime of the power storage device is given priority. Further, because the amount of heat generated from electrical unit 3 is larger than the amount of heat generated from storage battery 2, the air having cooled storage battery 2 can still cool electrical unit 3. As seen from the above, the power storage device according to an embodiment can efficiently cool the storage battery.

The power storage device according to an embodiment may be installed outdoors. Top wall 12 of casing 1 may be exposed to sunlight. In the power storage device according to an embodiment, storage battery 2 is disposed on the bottom wall 11-side. Therefore, in the power storage device according to an embodiment, storage battery 2 is less likely to be affected by temperature increase due to exposure to sunlight.

In the power storage device according to an embodiment, storage battery 2 disposed in casing 1 is separated from bottom wall 11. Storage battery 2 is therefore less likely to be affected by rainwater and the like that enters casing 1. Rainwater and the like entering casing 1 is drained from through hole 11c into the outside of casing 1.

In the case where support plate 5 has opening 51 in the power storage device according to an embodiment, air introduced by first fan 4 from air inlet 13c into casing 1 passes through opening 51 to be supplied to a nearby region of storage battery 2. Therefore, in this case, storage battery 2 can be cooled more efficiently.

Air which is introduced by first fan 4 from air inlet 13c into casing 1 may contain dust, insect, or the like. In the case where the power storage device according to an embodiment includes filter 6, dust, insect, or the like contained in air which is introduced from air inlet 13c into casing 1 is caught by filter 6, while the air passes through opening 51. Therefore, in this case, dust, insect, or the like contained in the air can be prevented from reaching the peripheries of the storage battery, the cooling unit, and the electrical unit.

In the case where support plate 5 includes protrusion 52 in the power storage device according to an embodiment, the position of storage battery 2 on support plate 5 is restricted by protrusion 52. Therefore, in this case, positional displacement of storage battery 2 on support plate 5 can be suppressed.

In the case where protrusion 52 is covered with protective member 7 in the power storage device according to an embodiment, damage to storage battery 2 due to contact of storage battery 2 against protrusion 52 can be suppressed.

In the case where protective member 7 is a flexible busing in the power storage device according to an embodiment, protective member 7 can be attached easily to protrusion 52.

In the case where the power storage device according to an embodiment includes fixture 8, the position of storage battery 2 is fixed by fixture 8 and the space between storage battery 2 and first fan 4 is defined by fixture 8. Air introduced from air inlet 13c and cooling storage battery 2 then passes through this space without being blocked by fixture 8 and thereafter drawn into first fan 4. Therefore, in this case, the position of storage battery 2 can be fixed without hindering cooling of storage battery 2 and electrical unit 3.

In the case where fixture 8 of the power storage device according to an embodiment includes cushioning member 81, damage to storage battery 2 due to excessive stress applied from fixture 8 to storage battery 2 can be suppressed.

In the case where electrical unit 3 includes seal member 31, heat-generating component 32, and heat sink 33 in the power storage device according to an embodiment, electrical unit 3 can be cooled while the inside of electrical unit 3 is kept dustproof.

In the case where electrical unit 3 includes second fan 34 in the power storage device according to an embodiment, heat from heat-generating component 32 can be agitated in electrical unit 3 by second fan 34. The agitated heat is discharged to the outside of electrical unit 3 through heat sink 33 exposed at least partially from seal member 31. Because second fan 34 may have at least the capability of agitating air in electrical unit 3, the output power of second fan 34 can be made smaller than that of first fan 4. Therefore, in this case, the inside of electrical unit 3 can be cooled efficiently by a simple configuration, while the inside of electrical unit 3 is kept dustproof.

In the power storage device according to an embodiment, in the ease where side wall 13 has air outlet 13*d* and air outlet 13*d* is located closer to bottom wall 11 than first fan 4 is, rainwater and the like can be prevented from entering casing 1 even when first fan 4 stops operating.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

1 casing; 11 bottom wall; 11*a* inner surface; 11*b* outer surface; 11*c* through hole; 12 top wall; 13 side wall; 13*a* inner surface; 13*b* outer surface; 13*c* air inlet; 13*d* air outlet; 14 leg; 2 storage battery; 3 electrical unit; 31 seal member; 32 heat-generating component; 33 heat sink; 34 second fan; 4 first fan; 5 support plate; 51 opening; 52 protrusion; 53 column; 6 filter; 7 protective member; 8 fixture; 81 cushioning member

The invention claimed is:

1. A power storage device comprising:
    a casing including a bottom wall and a top wall opposite to the bottom wall;
    a storage battery disposed in the casing and separated from the bottom wall;
    an electrical unit disposed in the casing and located closer to the top wall than the storage battery is;
    a first fan disposed between the storage battery and the electrical unit; and
    a fixture to fix the storage battery, wherein
    the first fan directs air from the storage battery toward the electrical unit by being disposed between the storage battery and the electrical unit so as to face the storage battery or electrical unit,
    the fixture is disposed on a side of the first fan located to face the storage battery, is disposed along an outer periphery of the first fan and is in contact with the first fan, and defines a space between the storage battery and the first fan.

2. The power storage device according to claim 1, further comprising a support plate which is disposed in the casing and on which the storage battery is mounted, wherein the casing further includes a side wall continuing from the bottom wall and from the top wall,
    the support plate has an opening extending through the support plate in a portion where the storage battery is not mounted, and
    the side wall has an air inlet extending through the side wall and connecting a space between the bottom wall and the support plate to an outside of the casing.

3. The power storage device according to claim 2, further comprising a filter disposed to cover the opening.

4. The power storage device according to claim 2, wherein the support plate includes a protrusion disposed to sandwich the storage battery and protruding toward the top wall.

5. The power storage device according to claim 4, further comprising a protective member disposed to cover the protrusion.

6. The power storage device according to claim 1, wherein the fixture is protruding from the first fan toward the storage battery and abutting against the storage battery.

7. The power storage device according to claim 6, wherein the fixture includes a cushioning member disposed in a portion of the fixture, the portion being abutting against the storage battery.

8. The power storage device according to claim 1, wherein the electrical unit includes:
    a seal member;
    a heat-generating component disposed in a space defined by the seal member; and
    a heat sink disposed to face the first fan, and exposed at least partially from the seal member.

9. The power storage device according to claim 8, wherein the electrical unit further includes a second fan disposed in the space defined by the seal member.

10. The power storage device according to claim 1, wherein
    the casing further includes a side wall continuing from the top wall and from the bottom wall, and
    the side wall has an air outlet extending through the side wall and located closer to the bottom wall than the first fan is.

11. The power storage device according to claim 1, wherein at least a portion of each of the storage battery, the first fan, and the electrical unit are aligned with each other in a vertical direction.

* * * * *